United States Patent
Yun et al.

(10) Patent No.: US 7,433,419 B2
(45) Date of Patent: Oct. 7, 2008

(54) ICI CANCELLATION METHOD FOR AN OFDM SYSTEM

(75) Inventors: Jae-Yeun Yun, Bucheon-si (KR);
Yong-Hoon Lee, Daejon (KR);
Eung-Sun Kim, Suwon-si (KR);
Jong-Hyeuk Lee, Seongnam-si (KR);
Ho-Jin Kim, Seoul (KR); Chan-Soo Hwang, Yongin-si (KR); Seung-Hoon Nam, Seoul (KR)

(73) Assignees: Samsung Electronics Co., Ltd. (KR);
Korea Advanced Institute of Science and Technology (KR)

( * ) Notice: Subject to any disclaimer, the term of this patent is extended or adjusted under 35 U.S.C. 154(b) by 758 days.

(21) Appl. No.: 10/973,372

(22) Filed: Oct. 26, 2004

(65) Prior Publication Data

US 2005/0147176 A1 Jul. 7, 2005

(30) Foreign Application Priority Data

Oct. 27, 2003 (KR) .................. 10-2003-0075197

(51) Int. Cl.
*H04K 1/02* (2006.01)
*H04L 25/03* (2006.01)
*H04L 25/49* (2006.01)
*H03K 9/00* (2006.01)
*H04L 27/00* (2006.01)

(52) U.S. Cl. ..................... 375/296; 375/285

(58) Field of Classification Search ......... 375/259–260, 375/295, 285, 296, 346; 370/203, 206
See application file for complete search history.

(56) References Cited

U.S. PATENT DOCUMENTS

| | | | | |
|---|---|---|---|---|
| 6,654,431 B1 * | 11/2003 | Barton et al. | ............... | 375/346 |
| 6,928,120 B1 * | 8/2005 | Zhang | ................. | 375/260 |
| 6,990,153 B1 * | 1/2006 | Farhang-Boroujeni et al. | ... | 375/260 |
| 6,992,973 B2 * | 1/2006 | Sakoda et al. | ............... | 370/208 |
| 7,139,320 B1 * | 11/2006 | Singh et al. | ................ | 375/260 |
| 7,139,321 B2 * | 11/2006 | Giannakis et al. | ........... | 375/260 |
| 7,197,084 B2 * | 3/2007 | Ketchum et al. | ............ | 375/296 |
| 7,248,559 B2 * | 7/2007 | Ma et al. | .................... | 370/208 |
| 7,251,768 B2 * | 7/2007 | Giannakis et al. | ........... | 714/755 |
| 7,292,647 B1 * | 11/2007 | Giannakis et al. | ........... | 375/295 |

* cited by examiner

*Primary Examiner*—Jean B Corrielus
(74) *Attorney, Agent, or Firm*—The Farrell Law Firm, PC

(57) ABSTRACT

In the ICI cancellation method for OFDM communication system, a receiver performs channel estimation using pilot subcarriers included in transmission signals transmitted from at least one transmitter. The transmitter generates the transmission signal in which pilot subcarriers and data subcarriers are regularly arranged, performs preceding on the transmission signal, modulates the pre-coded transmission signal into an OFDM symbol, and transmits the OFDM symbol. The receiver receives the OFDM symbol; demodulates the OFDM symbol, detects the pilot subcarriers from a demodulated signal, estimates channels using the pilot subcarriers, and restores the transmission signal using the estimated channels.

22 Claims, 10 Drawing Sheets $$\Theta = \begin{bmatrix} I_P & & & & & & & & \\ & C_E & & & & & & 0 & \\ & & \ddots & & & & & & \\ & & & C_E & & & & & \\ & & & & I_P & & & & \\ & & & & & C_E & & & \\ & & \underbrace{\phantom{XXX}}_{n} & & & & \ddots & & \\ & & & & & & & C_E & \\ & & & & & & & & \\ & & & & & & & I_P & \\ & 0 & & & & & & & C_E \\ & & & & & & & & & \ddots \\ & & & & & & & & & & C_E \end{bmatrix} \begin{array}{l} \Theta : N \times (N - n \cdot N_{CP}) \text{ MATRIX} \\ I_P : P \times P \text{ IDENTITY MATRIX} \\ C_E : \left(\frac{D}{n}\right) \times \left(\frac{D}{n} - 1\right) \text{ MATRIX} \end{array}$$

FIG.3

$$\Theta = \begin{bmatrix} I_P & & & & & \\ C_E & & & & 0 & \\ & I_P & & & & \\ & C_E & & & & \\ & & & \ddots & & \\ & & & & I_P & \\ & 0 & & & & C_E \end{bmatrix} \quad \begin{array}{l} \Theta : N \times (N - N_{CP}) \text{ MATRIX} \\ I_P : P \times P \text{ IDENTITY MATRIX} \\ C_E : D \times (D-1) \text{ MATRIX} \end{array}$$

FIG.4

$$S = \begin{bmatrix} S_P(0) \\ \vdots \\ S_P(P-1) \\ S_D(0) \\ \vdots \\ S_D(D-n-1) \\ S_P(P) \\ \vdots \\ S_P(2P-1) \\ S_D(D-n) \\ \vdots \\ S_D(2(D-n)-1) \\ \vdots \\ \vdots \end{bmatrix} \begin{matrix} \left.\vphantom{\begin{matrix}1\\2\\3\end{matrix}}\right\} \text{PILOT SYMBOL (P)} \\ \left.\vphantom{\begin{matrix}1\\2\\3\end{matrix}}\right\} \text{DATA SYMBOL (D-n)} \end{matrix}$$

ICI CANCELLATION METHOD FOR AN OFDM SYSTEM

PRIORITY

This application claims priority to an application entitled "ICI CANCELLATION METHOD FOR OFDM SYSTEM", filed in the Korean Intellectual Property Off ice on Oct. 27, 2003 and assigned Serial No. 2003-75197, the contents of which are hereby incorporated by reference.

BACKGROUND OF THE INVENTION

1. Field of the Invention

The present invention relates generally to an Orthogonal Frequency Division Multiplexing (OFDM) based wireless communication system, and more particularly to a method for cancelling Inter-Channel Interferences (ICIs) using a precoding technique.

2. Description of the Related Art

Recently, OFDM has been considered as representative fundamental technology of the next generation mobile communication system for supporting a requisite transfer rate of the next generation mobile communication service. The OFDM system compensates for frequency selective channels using a plurality of simple one-tap equalizers, such that it has simple equalization complexity. The OFDM system enables individual subcarrier bands to overlap with each other using orthogonality characteristics, resulting in high bandwidth efficiency. Therefore, the conventional broadband systems such as wireless LANs and DSLs have adopted the OFDM system as a data transmission scheme. However, in the mobile communication system using the OFDM, a channel variation between a transmission end and a reception end, due to the movement of the user, causes a serious problem.

The next generation mobile communication service uses a high frequency band of a maximum 5 GHz, and has a predetermined speed of 250 km per hour as a maximum moving speed of a user, resulting in the occurrence of a considerably high channel variation. If the OFDM system is used to obviate the aforementioned problem, there arises a channel variation in an OFDM symbol, such that an unexpected ICI occurs because of lost inter-channel orthogonality, resulting in deterioration of system performance.

In other words, an ICI occurs on the condition that a channel variation occurs in a single OFDM symbol interval. Therefore, in the case of using a general one-tap equalizer, there arise structural problems, for example, deterioration of detection performance, and a high Bit Error Rate (BER), because channel estimation is performed assuming that the inter-channel orthogonality is maintained even though it is not maintained in a real condition.

The research method for solving the aforementioned problems is largely classified into two research methods. A first research method uses modulation/demodulation methods to cancel ICI. A second research method is a new architecture equalization scheme, which performs channel modeling according to time-varying characteristics to perform channel estimation and uses a time-varying channel parameter.

A representative ICI cancellation method that is well known in the art is an ICI-self-cancellation modulation/demodulation scheme. In a modulation mode, the ICI-self-cancellation modulation/demodulation scheme transmits signals to be transmitted over even subcarriers, and transmits negative(−) values of the signals transmitted to the even subcarriers to odd subcarriers. In a demodulation mode, the ICI-self-cancellation modulation/demodulation scheme subtracts signals received in the odd subcarriers from the other signals received in the even subcarriers in such a way that it can recover the original signal. The demodulated subcarrier reception signal cancels its own ICI in such a way that a transmission signal passes through a single-path channel using an approximation method. The aforementioned ICI cancellation method uses a DPSK (Differential Phase Shift Keying) scheme, and does not consider time-varying channel estimation.

However, the aforementioned ICI cancellation method uses only even subcarriers to transmit data, and uses odd subcarriers to cancel ICI, resulting in 50% band efficiency. Also, the ICI cancellation method uses the DPSK modulation scheme, resulting in lower frequency selectivity. Because the frequency selectivity makes a double effect to the DPSK performance, the low frequency selectivity significantly deteriorates the system performance.

Further, if the total number of subcarriers increases to lower the frequency selectivity, the length of OFDM symbol interval also increases, such that a high channel variation occurs in a single OFDM symbol interval and an ICI excessively increases to make it impossible to perform ICI cancellation, resulting in system performance deterioration.

A conventional time-varying channel estimation/equalization method proposed an improved method capable of modeling a channel variation in the OFDM symbol, and estimating a time-varying channel parameter using a pilot subcarrier. The conventional time-varying channel estimation/equalization method also disclosed a method for arranging pilot subcarriers to acquire optimum channel estimation performance. Although this channel estimation method can estimate a channel varying with time, it unavoidably deteriorates channel estimation performance due to the increasing ICI when the channel variation increases. In this case, although the number of pilot subcarriers may increase to improve the channel estimation performance, a large number of pilot subcarriers are required to reduce the ICI influence, resulting in serious deterioration of band efficiency.

Provided that the time-varying channel estimation value is given, the OFDM system may use a variety of time-channel equalization methods. Provided that the total number of subcarriers of the OFDM system is set to N, a transmission signal vector is set to $X=[X(0), \ldots, X(N-1)]^T$, a reception signal vector is set to $Y=[Y(0), \ldots, Y(N-1)]^T$, and an AWGN noise vector having dimensions of N×1 is set to W, the relationship between transmission and reception signals is denoted by Equation 1.

$$Y = HX + W \quad (1)$$

The N×N matrix H, which is in the form of a diagonal matrix with the orthogonality between the subcarriers, shows as a matrix of which entries are fully non-zero under the influence of the ICI. Equalization is a process for finding an X-vector from a Y-vector using H-matrix entries acquired from the time-varying channel estimation value.

In a conventional equalization technique, the matrix H is considered with fully non-zero entries so as to use an inverse matrix of H for equalization. Other known equalization technique uses the characteristic in that the diagonal entries and their peripherals of the matrix H have high value relative to remaining ones even when the ICI exists, so as to simplify the inverse matrix calculation complexity by assuming that the diagonal entries and their peripherals are non-zero. However, the first equalization technique requires much calculation complexity in proportional with the number of subcarriers such that it is unpractical in real system. Additionally, the second technique has a problem in that the equalization performance deteriorates due to the difference between the assumption of large ICI and the real ICI environment.

The equalization technique for a time-varying channel has more disadvantages in that it unavoidably increases channel estimation error due to the ICI especially when the mobile terminal moves in high velocity.

As described above, the conventional ICI cancellation modulation/demodulation techniques has drawbacks in that the low frequency selectivity decreases the system performance and the utilization of the half of total subcarriers for ICI cancellation decreases the bandwidth efficiency.

Also, the conventional equalization technique has drawbacks in that the estimation performance considerably decreases in the time varying channel due to the large ICI and the bandwidth efficiency decreases when increasing the number of the pilot subcarriers for enhancing the channel estimation performance.

SUMMARY OF THE INVENTION

Therefore, the present invention has been designed in view of the above and other problems, and it is an object of the present invention to provide an ICI cancellation method for use in an OFDM system, which is capable of removing ICI using a preceding technique so as to enhance the channel estimation performance.

It is another object of the present invention to provide an ICI cancellation method for use in an OFDM system, which is capable of reducing the equalization complexity by removing interfering the pilot subcarriers with the data subcarriers.

It is yet another object of the present invention to provide an ICI cancellation method for use in an OFDM system, which cancels data subcarriers components interfering with the pilot subcarriers for accurate channel estimation and pilot subcarriers components interfering with the data subcarriers for equalization using a precoding technique, thereby improving the overall system performance.

To achieve the above and other objects, an ICI cancellation method for use in an OFDM communication system is provided, in which a receiver performs channel estimation using pilot subcarriers included in transmission signals transmitted from at least one transmitter. The method comprises: generating, at the transmitter, the transmission signal in which pilot subcarriers and data subcarriers are regularly arranged; preceding the transmission signal; modulating a pre-coded transmission signal into an OFDM symbol; transmitting the OFDM symbol; receiving, at the receiver, the OFDM symbol; demodulating the OFDM symbol; detecting the pilot subcarriers from a demodulated signal; estimating channels using the pilot subcarriers; and restoring the transmission signal using the estimated channels.

In another aspect of the present invention, a precoding method for use in an OFDM communication system is provided, in which a receiver performs channel estimation using pilot subcarriers included in transmission signals transmitted from at least one transmitter. This method comprises: arranging at least one pilot subcarrier group including a plurality of subcarriers so as to be arranged in a regular interval in association with the data subcarriers in a transmission signal; preceding the transmission signal; and modulating the pre-coded transmission signal into an OFDM symbol.

In another aspect of the present invention, there is provided an OFDM communication system including a transmitter for transmitting a symbol having data signals and pilot signals and a receiver for receiving the symbol so as to recover the data signals. The transmitter comprises: a modulator for modulating input data signals so as to output a modulation signal according to at least one modulation scheme; a pilot inserter for inserting pilot signals into the modulation signal so as to output a transmission signal; a pre-coder for precoding the transmission signal so as to output a pre-coded signal; and an OFDM modulator for OFDM-modulating the pre-coded signal into a symbol and transmitting the symbol over antennas.

BRIEF DESCRIPTION OF THE DRAWINGS

The above and other objects, features, and advantages of the present invention will be more clearly understood from the following detailed description taken in conjunction with the accompanying drawings, in which:

FIG. 3 is a configuration illustrating a precoding matrix to be applied to an ICI cancellation method in accordance with the present invention;

FIG. 4 is a configuration illustrating a precoding matrix established when the precoding matrix illustrated in FIG. 3 has maximal band efficiency in accordance with the present invention;

FIG. 5 is a configuration illustrating a transmission signal vector for use in an ICI cancellation method in accordance with the present invention;

FIG. 7 is a conceptual diagram illustrating the relationship between a transmission signal vector and a reception signal vector having no ICI for use in an ICI cancellation method in accordance with the present invention.

DETAILED DESCRIPTION OF THE PREFERRED EMBODIMENTS

Figure 1:
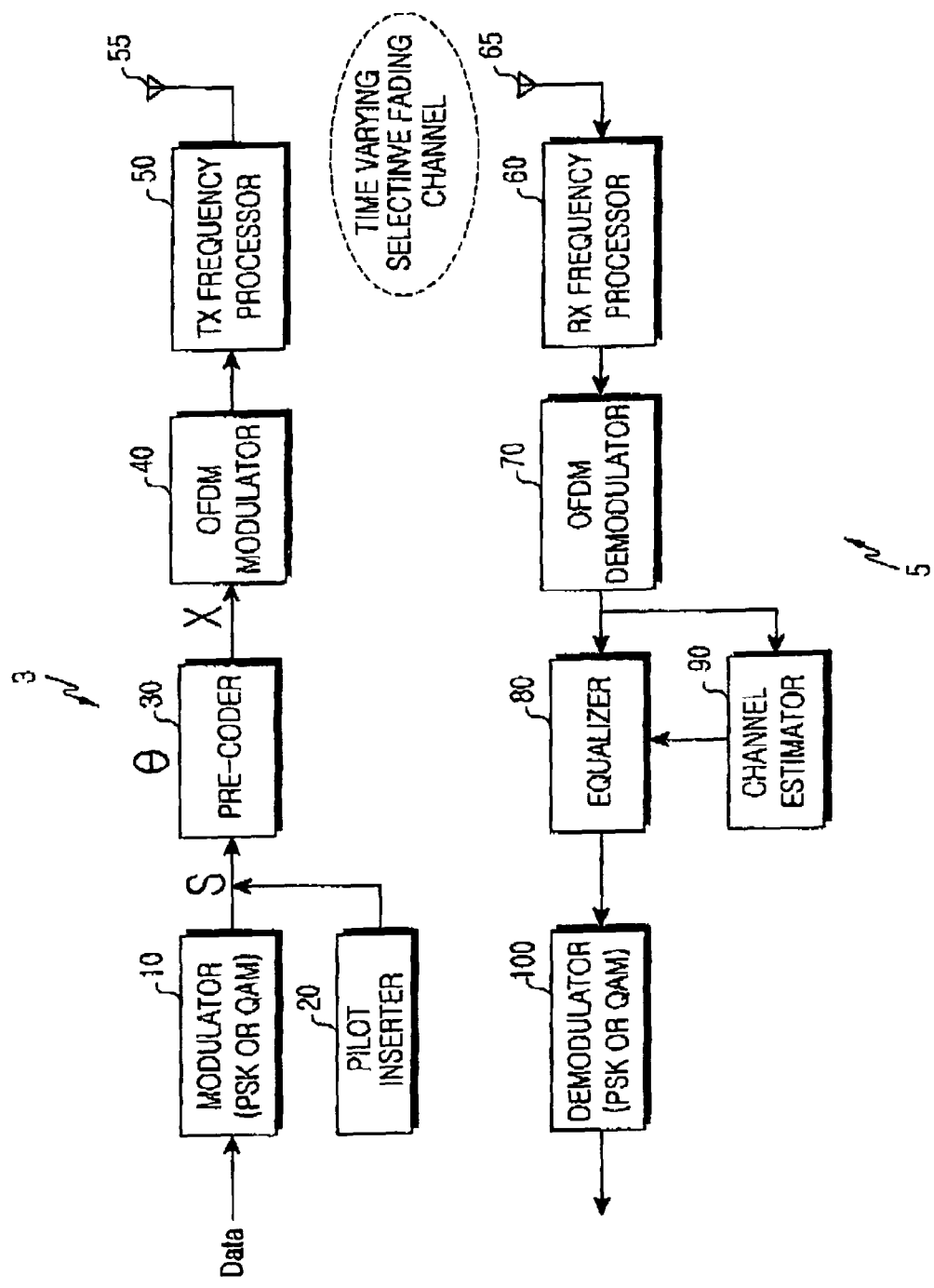
FIG. 1 is a block diagram illustrating an OFDM system in accordance with the present invention.

Preferred embodiments of the present invention will be described in detail herein below with reference to the annexed drawings. In the drawings, the same or similar entries are denoted by the same reference numerals even though they are depicted in different drawings. In the following description, a detailed description of known functions and configurations incorporated herein will be omitted when it may make the subject matter of the present invention rather unclear.

In the OFDM based mobile communication system, channels of individual OFDM symbol intervals are continuously changed. Accordingly, the conventional channel estimation technique using a preamble training signal does not work well in OFDM mobile communication system, such that the channel estimation and equalization should be performed per OFDM symbol using the pilot subcarriers therein.

FIG. 1 is a block diagram illustrating an OFDM system in accordance with the present invention. Referring to FIG. 1, a transceiver includes a transmitter 3 for transmitting an OFDM signal over an antenna 55 and a receiver 5 for receiving the OFDM signal over an antenna 65. Input data of the transmitter 3 is modulated by a modulator 10 according to a PSK or QAM scheme to output a modulated symbol, and a pilot insertion module 20 adds pilot symbol to the modulated symbol to output a symbol including the data and pilot symbols to a pre-encoder 30. The symbol S is pre-encoded into a pre-encoded symbol X by the pre-encoder 30 and then transmitted to the OFDM modulator 40, to be modulated into OFDM symbols. The OFDM symbols generated from the OFDM modulator 40 are processed in a transmission signal processor 50 and then transmitted via the transmission antenna 55.

The signal received via the antenna 65 of the receiver 5 is processed by a reception signal processor 60, and is demodulated by an OFDM demodulator 70. The demodulated signal is recovered to the transmit data after removing the pilot channel (pilot symbol) by an equalizer 80 using a channel estimation value estimated by a channel estimator 90 and then the transmit data is demodulated by a demodulator so as to be output as the original data.

The encoding process of the pre-encoder 30 is performed by multiplying the symbol S by a pre-code matrix. The pre-code matrix is used after an arrangement of pilot subcarriers, used for time-varying channel estimation, has been determined. If the pilot subcarriers are grouped and arranged in a subcarrier domain at intervals of the same distance, optimum time-varying channel estimation performance can be expected.

Figure 2:
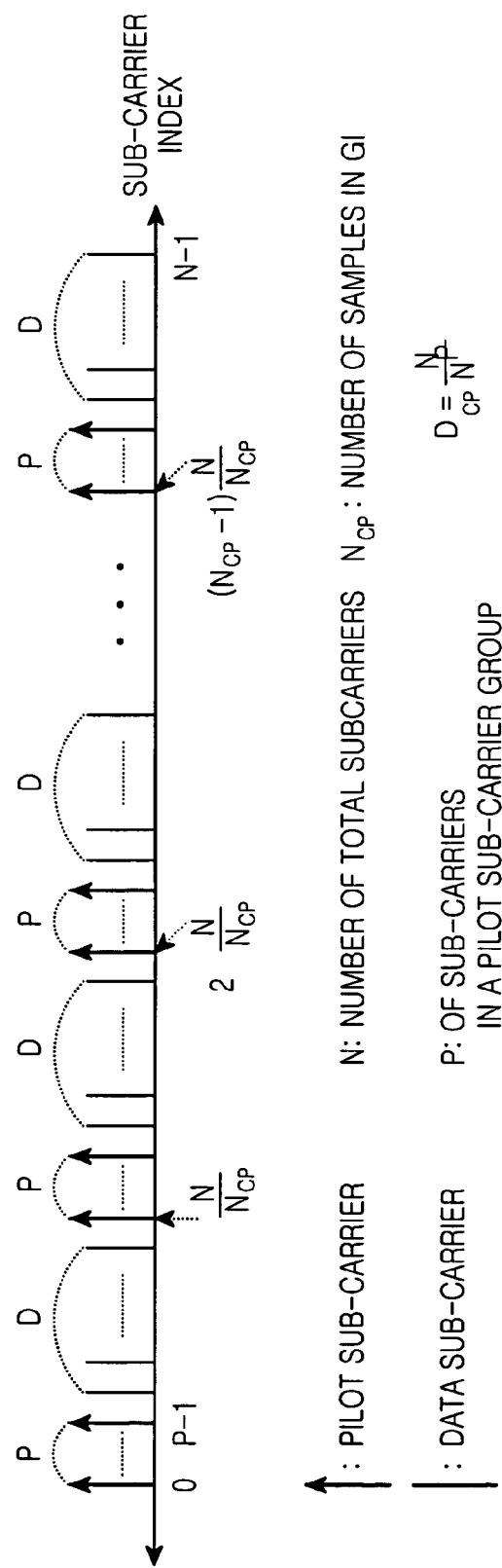
FIG. 2 is a conceptual diagram illustrating an arrangement relationship between pilot subcarriers and data subcarriers to be applied to an OFDM system in accordance with the present invention.

FIG. 2 is a conceptual diagram illustrating an arrangement of the pilot subcarriers and data subcarriers in accordance with the present invention. Each pilot subcarrier group includes P pilot subcarriers, and the number of pilot subcarrier groups is $N_{cp}$. The pilot subcarrier groups are arranged at an interval of a predetermined distance $N/N_{cp}$. Therefore, the number of data subcarriers between pilot subcarrier groups becomes $D(=N/N_{cp}-P)$.

The ICI cancellation method of the present invention is mainly comprised of a pre-code configuration process, a time-varying channel estimation process using the pre-code, and a time-varying channel equalization process using a time-varying channel estimation value.

1. Pre-Code Configuration Process

FIG. 3 is a drawing illustrating a precoding matrix in accordance with the present invention, and FIG. 4 is a drawing illustrating a precoding matrix showing maximal bandwidth efficiency in accordance with the present invention. Referring to FIGS. 3 and 4, a preceding matrix θ has a form in that P×P identity matrices $I_p$ and data-section precoding matrices $C_E$ are alternatively arranged in diagonal direction and other entries are zeros. Each matrix $C_E$ is designed to satisfy the following conditions:

$$C_E^H \cdot C_E = \alpha \cdot I_{(D/n-1)}, \text{ where } \alpha = const. \quad \text{(Condition 1)}$$

$$\sum_{k=0}^{D/n-1} c_k = 0, \text{ where } c_m \text{ is indicative of the} \quad \text{(Condition 2)}$$

$1 \times (D/n - 1)$ row vector defined by $C_E [c_0^T \ldots c_{(D/n-1)}^T]^T$ $$tr(C_E C_E^H) = \frac{D}{n} \quad \text{(Condition 3)}$$

For example, the matrix $C_E$ is generated by, when $$\frac{D}{n}$$

is an integer, forming $$\frac{D}{n} \times \frac{D}{n}$$

discrete Fourier Transform (DFT) matrix and removing a first column of the $$\frac{D}{n} \times \frac{D}{n}$$

DFT matrix or by, when $$\frac{D}{n} = 2^t$$

generating $$\frac{D}{n} \times \frac{D}{n}$$

Hadamard matrix and removing a first column. In this case, the preceding matrix is composed of 1's or −1's so as to be simply used for preceding.

2. Time-Varying Channel Estimation Process

The transmitter can transmit $N_{cp}(D-n)$ symbols modulated with PSK or QAM during a single OFDM symbol interval. The least number of the symbols in one OFDM symbol for performing the ICI self-cancellation is $N_{cp}$ (in case of n=1). A transmission vector (symbol) S, as illustrated in FIG. 5 is multiplied by the precoding matrix θ as denoted by X=θS so as to be pre-encoded and OFDM-modulated. A receiver performs time-varying channel estimation using pilot subcarriers among reception signals. ICIs generated by data subcarriers components affecting the pilot subcarriers are removed by the precoding process, resulting in high time-varying channel estimation performance.

3. Time-Varying Channel Equalization Process

The receiver equalizes a reception signal after performing an OFDM demodulation process, to recover transmission data symbols. The equalization process acquires an H matrix from the time varying channel estimation value using Equation 1 and acquires an $H_D$ matrix using Equation 2.

$$H_D = H\theta \quad (2)$$

If AWGN noise between the transmission signal vector S and the reception signal vector Y generated after the transmission end performs a DFT process is ignored, the reception signal Y can be denoted as in Equation 3.

$$Y = H_D S \quad (3)$$

Figure 6:
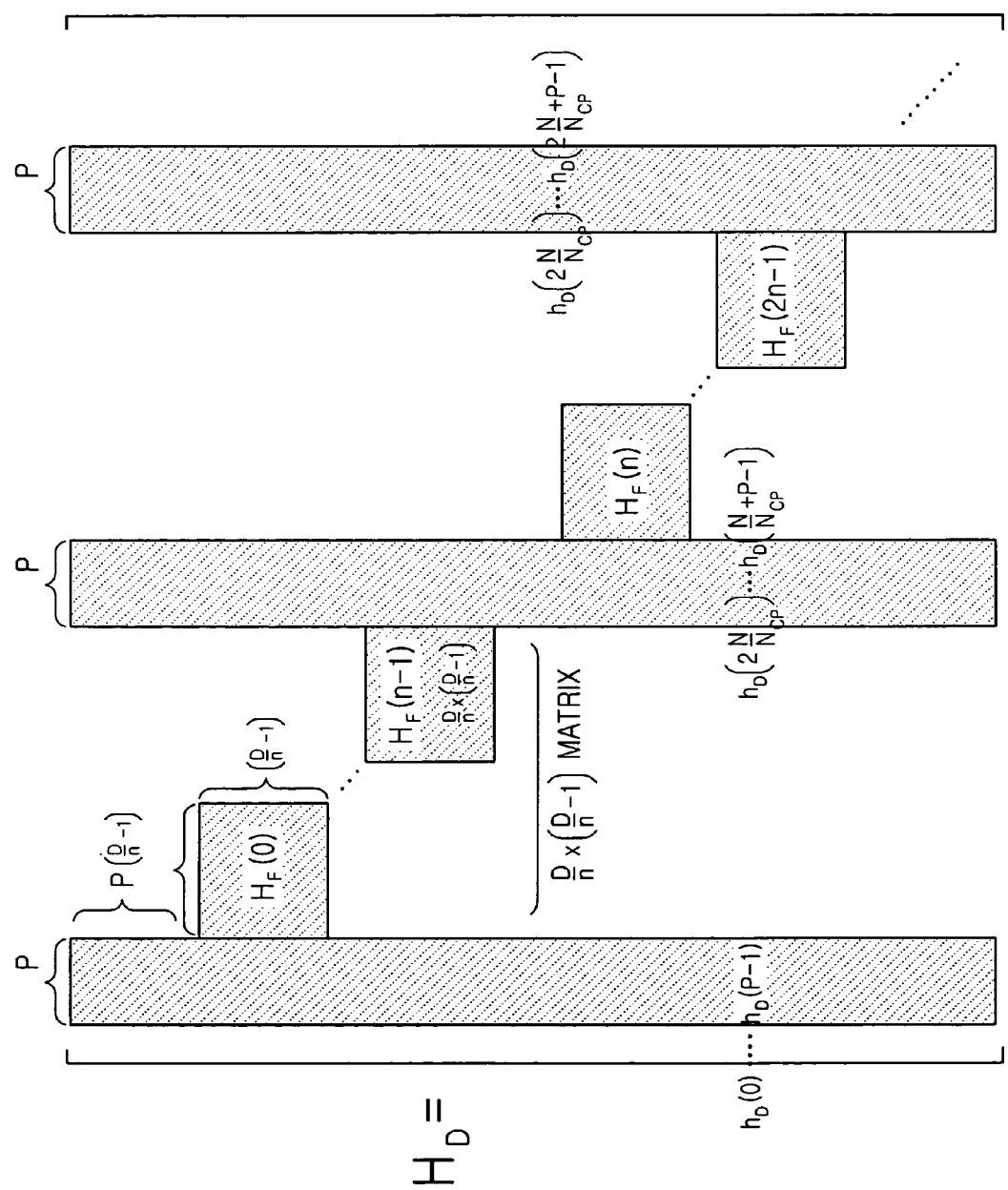
FIG. 6 is a configuration illustrating a signal matrix established when a precoding method is adapted to an ICI cancellation method in accordance with the present invention.

After performing the precoding process, the matrix $H_D$ can be configured in the form as illustrated in FIG. 6, as denoted by $H_D=[h_D(0) \ldots h_D(N-nN_{CP}-1)]$ (where $h_D(\cdot)$ is an N-dimensional column vector). The remaining parts other than boxes of FIG. 6 are filled with zeros.

Interference caused by pilot subcarriers on the basis of a decoded reception signal is cancelled by the following Equation 4:

$$Y_C = Y_D - \sum_{k=0}^{N_{CP}P-1} S_P(k) \cdot h_D(i(k)) \tag{4}$$

where $S_P(k)$ is a k-th pilot symbol among $N_{CP}P$ transmission pilot symbols, and i(k) is a subcarrier index of each pilot subcarrier used for the k-th pilot symbol. i(k) can be expressed as in Equation 5.

$$i(k)=N/N_{CP}\cdot[k/P]+(k \bmod P) \tag{5}$$

A vector $Y_c$ acquired by ICI cancellation removes interference (i.e., $h_D(i(k))$, where $k=0,\ldots,(N_{CP}P-1)$) caused by pilot symbols affecting overall subcarrier reception signals from the matrix $H_D$ illustrated in FIG. 6, such that it contains only the remaining (D/n−1)×(D/n−1)-dimensional matrices $H_F(k)$ (where $k=0, \ldots, (nN_{CP}-1)$). Therefore, the relationship between the transmission signal vector S and the vector $Y_c$ having no interference caused by pilot symbols can be reconstructed using Equation 2, as denoted in Equation 6.

$$Y_F(k)=H_F(k)S_F(k), k=0,\ldots,(nN_{CP}-1) \tag{6}$$

The transmission data symbols $S_F(\cdot)$ are estimated and/or detected by an MMSE (Minimum Mean Squared Error) or V-BLAST scheme, such that they are restored to transmission data.

At the receiver, the pilot symbols are damaged by interference derived from the data symbols, such that a time-varying channel estimation performance is deteriorated, resulting in deterioration of detection performance of a transmission signal. Therefore, in order to solve the aforementioned problems, the present invention provides an ICI cancellation method using a precoding scheme such that it can carry out ICI-self-cancellation operation without using channel information.

The preceding matrix is based on unique characteristics of a channel matrix H between OFDM transmission and reception signals X and Y shown in Equation 1. If a channel variation occurs during a single OFDM symbol interval, ICI occurs, such that the matrix H is changed to a matrix of which entries are all zeros. If a channel variation is slow, diagonal entries of the matrix H are set to high values, and other entries positioned at a remote site from the diagonal entries are set to relatively low values, such that the remaining entries other than peripheral entries of the diagonal entries are negligible. However, the faster the channel variation, the smaller the values of the diagonal entries. Additionally, the values of non-diagonal entries become greater (i.e., the ICI increases).

In this case, values of entries far away from the diagonal entries increases such that they are not negligible, which increases the channel estimation errors of the conventional channel estimation scheme. As can be seen from non-diagonal entries of the matrix H, it can be experimentally understood that individual entries have values similar to those of their peripheral entries other than diagonal entries. The preceding matrix of the present invention uses such characteristics of the matrix H.

Referring to a reception signal corresponding to a pilot subcarrier so as to find a method for reducing ICI a channel estimation mode using pilot symbols, a subcarrier corresponding to a subcarrier index k is used as a pilot subcarrier.

If AWGN noise is neglected, a reception signal of the subcarrier k can be denoted as in Equation 7.

$$Y(k) = \sum_{j=0}^{N-1} [H]_{k,j} X(j) \tag{7}$$

$$= \sum_{pilot\ subcarrier} [H]_{k,j} X(j) + \sum_{Data\ subcarrier} [H]_{k,j} X(j)$$

where $$\sum_{pilot\ subcarrier} [H]_{k,j} X(j)$$

represents pilot subcarriers known to the receiver in order to be a desired signal component for performing a time-varying channel estimation, and $$\sum_{Data\ subcarrier} [H]_{k,j} X(j)$$

represents data subcarriers, which are to be regarded as noise. Non-diagonal entries of the matrix H have values similar to those of peripheral entries, such that the data subcarrier transmission signal acting as noise can be removed on the condition that the data subcarrier transmission signal is configured in the form as shown in Equation 8.

$$\sum_{k=0}^{D/n-1} X\left(2P\cdot\left[1+\frac{m}{n}\right]+\left(\frac{D}{n}\right)\cdot m + k\right) = 0,\ m=0,\ldots,(nN_{CP}-1) \tag{8}$$

The precoding matrix of the present invention enables a symbol to be transmitted to have the characteristics of Equation 8. In order for the preceding matrix to have the characteristic, the condition, i.e.

$$\sum_{k=0}^{D/n-1} c_k = 0,$$

where $C_m$ is indicative of 1×(D/n−1) row vector defined by $c^E = [c_0^T \ldots C_{(D/n-1)}^T]^T$, should be satisfied.

In conclusion, if the precoding process is adopted to a transmission data symbol, the noise is reduced during the channel estimation such that estimation performance is improved. When the precoding matrix θ illustrates in FIG. 3 is multiplied by a transmission signal vector S to constitute an OFDM transmission vector X, data symbols are pre-encoded and configured in the form of new data symbols. In this case, in order to maintain a distance between transmission signal vectors S, each composed of QPSK or M-QAM signal symbols, even though a preceding process has been performed, or in order to maintain independency between entries of each the transmission signal vector S, the condition 1 must be satisfied.

Provided that the condition 1 is satisfied, a maximum diversity gain can be acquired by the precoding process. However, provided that the preceding matrix is configured to satisfy the three conditions and to obtain a maximum encoding gain, a slight encoding gain can be acquired. Particularly, the condition 3 is for restricting a transmit power.

The relationship shown in Equation 2 is established between the transmission signal vector S and the reception signal vector Y. The matrix $H_D$ is configured in the form illustrated in FIG. 6.

The precoding matrix's specific parts multiplied by pilot subcarriers are identity matrices, and ICIs caused by them are not attenuated so that they affect overall subcarriers. Therefore, ICIs caused by pilot subcarriers must be removed from a reception signal.

The matrix $H_D$ can be acquired from a time-varying channel estimation value, and the reception end pre-recognizes pilot symbols, such that ICI cancellation using pilots can be established by Equation 4. The matrix $C_E$ from among the precoding matrices is multiplied by data subcarrier symbols, and is determined to be zero '0' when entries of individual rows are summed up using the condition 2, so that non-diagonal entries of the matrix H have values similar to those of their peripheral entries other than diagonal entries. Some parts far from the diagonal entries of the matrix $H_D$ are cancelled and thereby include values approximating '0'. Therefore, ICI is cancelled, such that the relationship between transmission and reception signals can be partitioned if needed.

Figure 7:
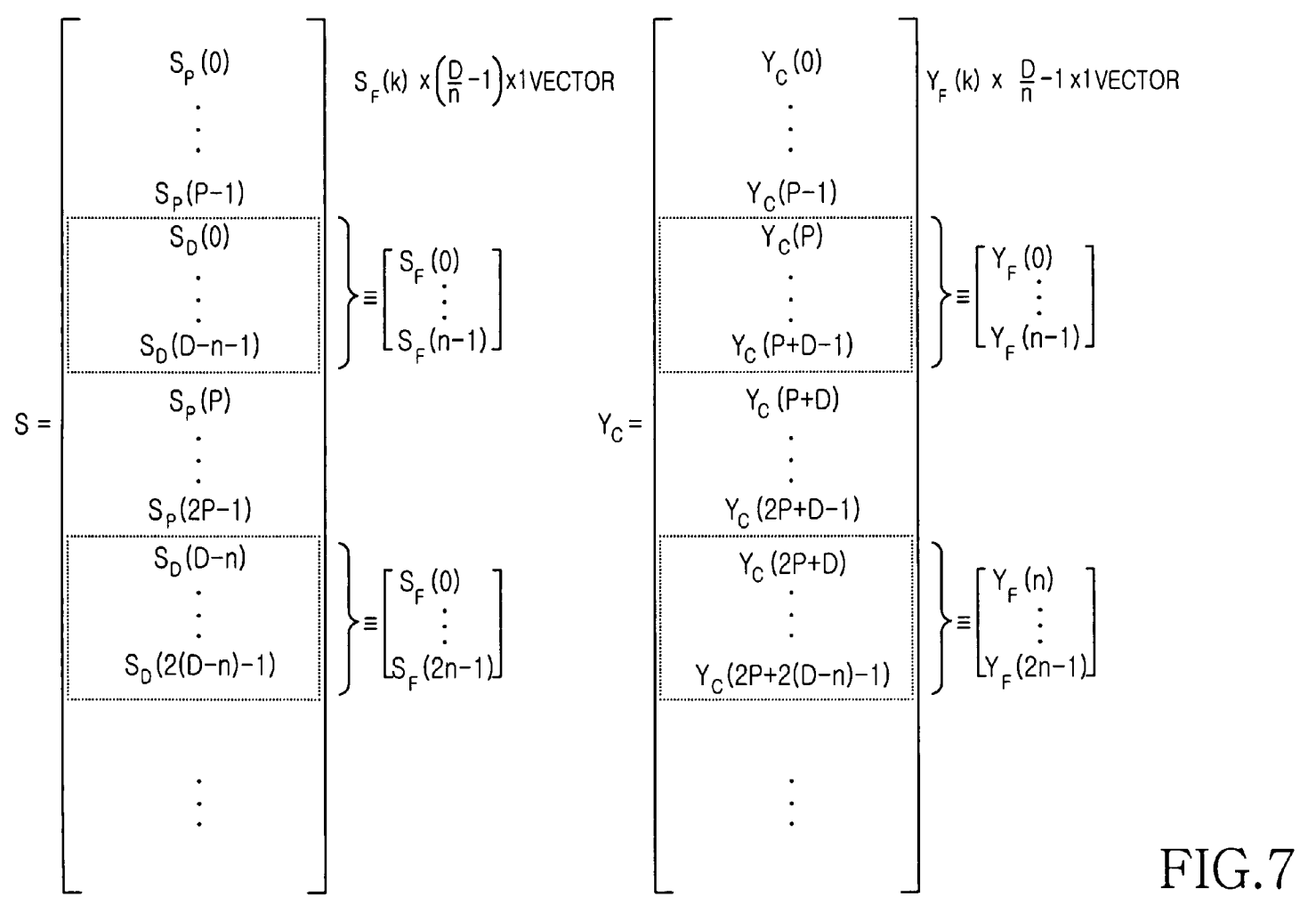

FIG. 7 is a conceptual diagram illustrating a relationship between a transmission signal vector and a reception signal vector having no ICI in accordance with the present invention. If the transmission/reception signals are partitioned from each other as illustrated in FIG. 7, a transmission signal can be detected by an MMSE or V-BLAST method. The relationship between the transmission/reception signals is partitioned by the precoding process, such that detection complexity can be greatly decreased without causing performance deterioration.

ICI caused when a frequency offset exists between the transmission and reception ends has the same configuration as in a channel variation case, such that it can be cancelled by the precoding process of the present invention.

Figure 8A:
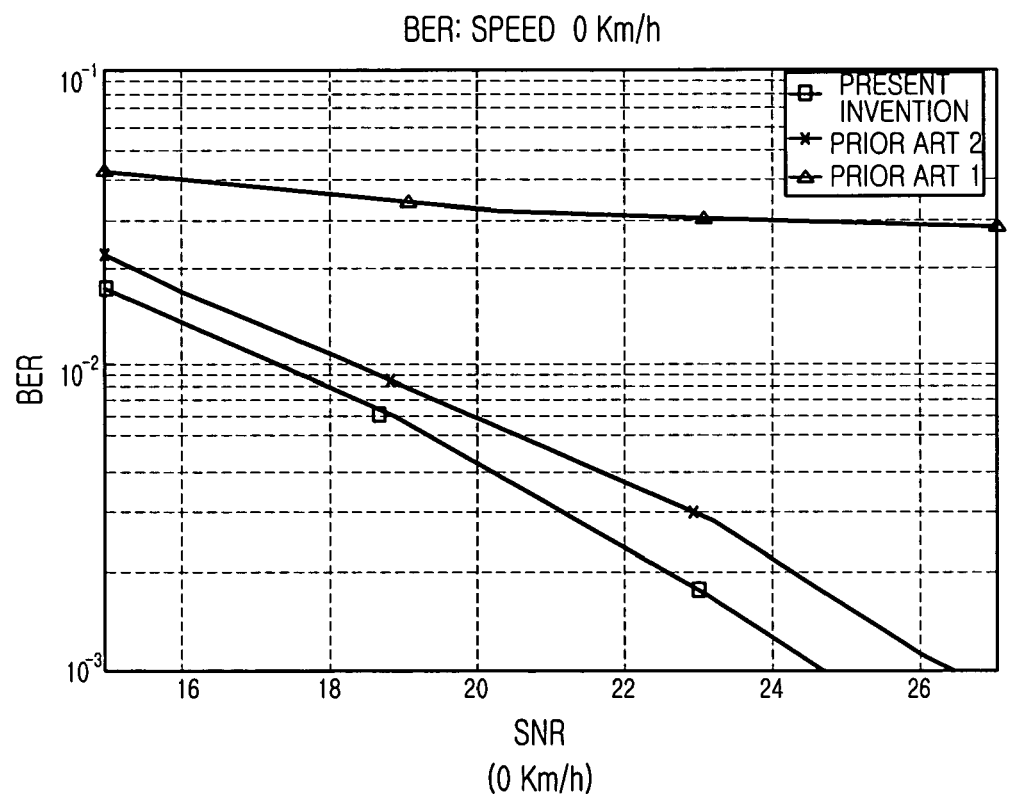
FIGS. 8a, 8b, and 8c are graphs illustrating comparison results between performance improvement degrees of the inventive ICI cancellation method and those of the conventional arts in association with speed information.
Figure 8B:
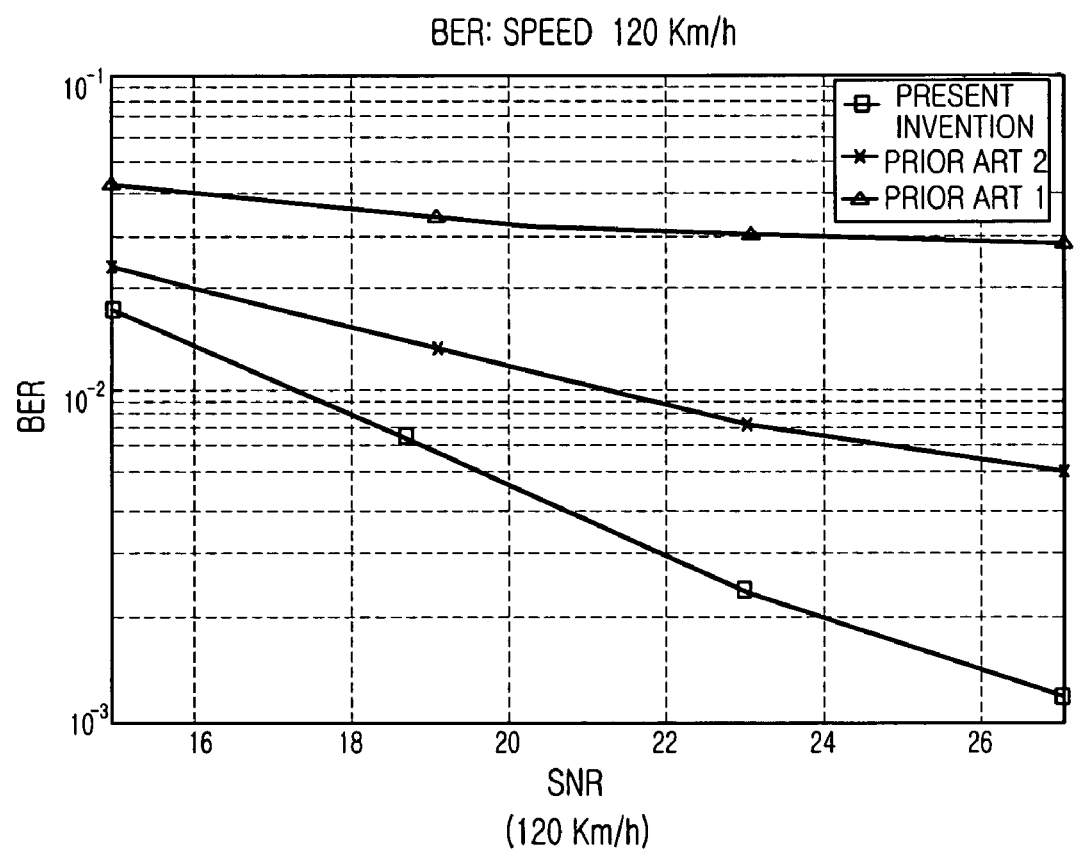
Figure 8C:
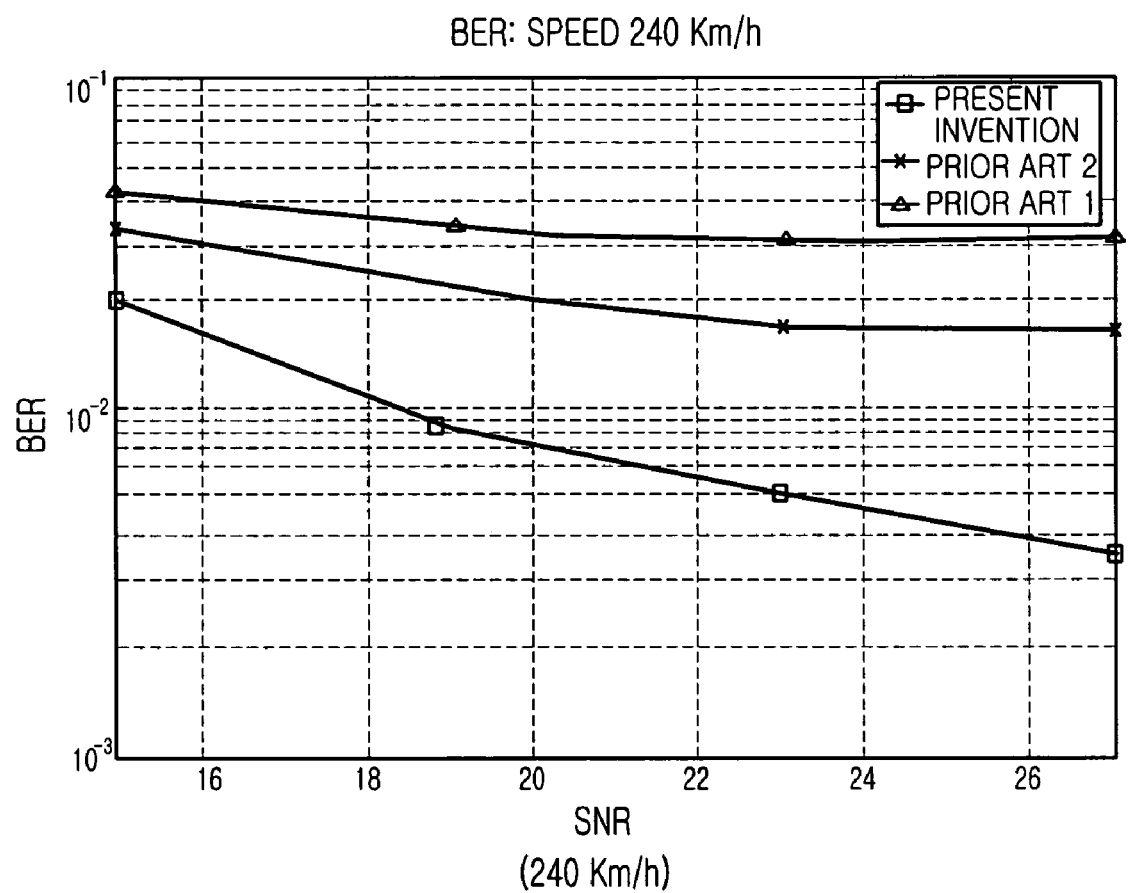

FIGS. 8a, 8b, and 8c are graphs illustrating the comparison results among individual performances of the inventive ICI cancellation method, the conventional ICI-self-cancellation modulation/demodulation method, and another conventional time-varying channel estimation/equalization method.

Simulation environments for comparing BER performance of the present invention with those of the conventional arts will hereinafter be described:

[Channel Environments]
Carrier Frequency: 5 GHz
Maximum channel delay: 20 μsec
The number of Channel Taps: 8 (Jakes Model, exponentially-reduced power profile)
Moving Speed: 0, 120, and 240 (km/h)
Time-varying channel model: linear model
[OFDM Parameters]
N=64, $N_{cp}$=8, and the length of single OFDM symbol interval is 240 μsec QPSK use
Single User, Single Cell
Channel Coding unconsidered to simplify a simulation process.

The aforementioned simulation compares individual BER performances of the present invention using a preceding code denoted by P=3, D=5, and n=1 based on a DFT matrix, the conventional time-varying channel estimation/equalization method (i.e., 2nd prior art) in the case of P=4, and another conventional ICI-self-cancellation modulation/demodulation method (1st prior art) in the case of an encoding rate of 1/2, while being classified according to a UE's moving speed. The aforementioned three cases have the same band efficiency. The first prior art transmits 31 information symbols to a prescribed destination. The first prior art uses a noncoherent modulation scheme, and thereby there is no need to perform a channel estimation process, such that pilot subcarriers are also not required.

As indicated above, FIGS. 8a, 8b, and 8c are graphs illustrating comparison results between performance improvement degrees of the inventive ICI cancellation method and those of the conventional arts in association with speed information. Referring to FIGS. 8a, 8b, and 8c, it is understood that the present invention acquires high performance, even when using a 5×4 MMSE equalizer of low equalization complexity. The conventional arts have disadvantages in that they cannot sufficiently perform necessary channel estimation when the ICI unavoidably increases due to a high user moving speed, such that an error floor phenomenon occurs in BER performance.

When using the precoding method of the present invention, although the number of pilot subcarriers used for channel estimation is reduced to provide the same band efficiency, a channel estimation performance is improved due to an ICI reduction effect caused by the preceding method, and an SNR (Signal-to-Noise Ratio) is also improved because data is transmitted over D subcarriers in such a way that a BER performance of the present invention is greatly superior to those of the conventional arts.

As is apparent from the description above, an ICI cancellation method of the present invention cancels a data subcarrier signal component, which acts as an interference signal during a time-varying channel estimation mode, resulting in improved time-varying channel estimation performance.

In addition, the ICI cancellation method of the present invention performs relationship division between transmission/reception signals while executing a time-varying channel equalization mode by means of the precoding process, such that equalization complexity can be simplified without causing performance deterioration.

Further, the ICI cancellation method of the present invention cancels even ICIs generated by a frequency offset between transmission/reception ends by means of the precoding process.

Although the preferred embodiments of the present invention have been disclosed for illustrative purposes, those skilled in the art will appreciate that various modifications, additions and substitutions are possible, without departing from the scope and spirit of the present invention as disclosed in the accompanying claims.

What is claimed is:

1. An ICI (Inter-Channel Interference) cancellation method for use in an OFDM (Orthogonal Frequency Division Multiplexing) communication system in which a receiver performs channel estimation using pilot subcarriers included in transmission signals transmitted from at least one transmitter, the method comprising:
generating a transmission signal in which pilot subcarriers and data subcarriers are regularly arranged;
precoding the transmission signal;
modulating the pre-coded transmission signal into an OFDM symbol;
transmitting the OFDM symbol;
receiving the OFDM symbol;
demodulating the OFDM symbol;
detecting the pilot subcarriers from the demodulated signal;

estimating channels using the pilot subcarriers; and restoring the transmission signal using the estimated channels, wherein the step of precoding the transmission signal comprises:

generating a precoding matrix according to an arrangement of the pilot subcarriers; and multiplying the transmission signal by the precoding matrix and the precoding matrix includes first matrices being multiplied with the pilot subcarriers, second matrices being multiplied with the data subcarriers, and non-diagonal entries of 0's.

2. The method as set forth in claim 1, wherein the first matrices are identity matrices corresponding to the pilot subcarriers.

3. The method as set forth in claim 1, wherein the second matrices maintain distances between the data subcarriers as signal vectors and independency between entries of each signal vector even after precoding the transmission signal.

4. The method as set forth in claim 1, wherein a sum of entries of each column of each of the second matrices is 0.

5. The method as set forth in claim 1, wherein the second matrices maintain mean power of the data subcarriers even after precoding the transmission signal.

6. The method as set forth in claim 1, wherein the second matrices maintain distances between the data subcarriers as signal vectors, independencies between entries of each signal vector, and mean power of the data subcarriers, and a sum of entries of each column of the second matrices is 0.

7. The method as set forth in claim 1, wherein the pilot subcarriers include at least one pilot-subcarrier group arranged in a regular interval in association with the data subcarriers.

8. The method as set forth in claim 7, wherein the first and second matrices of the precoding matrix are main diagonal entries.

9. The method as set forth in claim 8, wherein the first matrices are identity matrices corresponding to the pilot-subcarrier groups.

10. The method as set forth in claim 8, wherein the second matrices maintain distances between the data subcarriers as signal vectors, independencies between entries of each signal vector, and mean power of the data subcarriers, and a sum of entries of each column of the second matrices is 0.

11. The method as set forth in claim 1, wherein the step of restoring the transmission signal comprises:

removing interference caused by the pilot subcarriers; and recovering the transmission signal with the interference removed signal.

12. A precoding method for use in an OFDM (Orthogonal Frequency Division Multiplexing) communication system in which a receiver performs channel estimation using pilot subcarriers included in transmission signals transmitted from at least one transmitter, comprising:

arranging at least one pilot subcarrier group including a plurality of subcarriers in a regular interval in association with data subcarriers in a transmission signal;

precoding the transmission signal; and modulating the pre-coded transmission signal into an OFDM symbol, wherein the step of precoding the transmission signal comprises:

generating a precoding matrix according to an arrangement of the at least one pilot subcarrier group; and multiplying the transmission signal by the precoding matrix, wherein the precoding matrix includes first and second matrices being multiplied by the at least one pilot subcarrier group and the data subcarriers, respectively.

13. The method as set forth in claim 12, wherein the first and the second matrices are alternatively arranged as main diagonal entries of the precoding matrix, and other non-diagonal entries are 0's.

14. The method as set forth in claim 12, wherein the first matrices are identity matrices corresponding to the pilot subcarrier groups.

15. The method as set forth in claim 12, wherein the second matrices maintain distances between the data subcarriers as signal vectors, independencies between entries of each signal vector, and mean power of the data subcarriers, and a sum of entries of each column of the second matrices is 0.

16. An OFDM communication system including a transmitter for transmitting a symbol having data signals and pilot signals, and a receiver for receiving the symbol to recover the data signals, wherein the transmitter comprises:

a modulator for modulating input data signals to output a modulation signal according to at least one modulation scheme;

a pilot inserter for inserting pilot signals into the modulation signal to output a transmission signal;

a pre-coder for precoding the transmission signal to output a pre-coded signal; and an OFDM modulator for OFDM-modulating the pre-coded signal into a symbol and transmitting the symbol over an antenna, wherein the pre-coder generates a precoding matrix according to an arrangement of the pilot signals and multiplies the transmission signal by the precoding matrix, the precoding matrix includes first and second matrices, the first matrix being multiplied with the pilot signals and second matrix being multiplied with the data signals and non-diagonal entries of zeros, and the pilot signals include at least one pilot group arranged in a regular interval in association with the data signals.

17. The OFDM communication system as set forth in claim 16, wherein the receiver comprises:

an OFDM demodulator for demodulating the symbol received through an antenna into the pre-coded signal;

a channel estimator for detecting the pilot signals from the pre-coded signal and estimating channels using the pilot signals;

an equalizer for restoring the modulation signal using an estimation value estimated by the channel estimator and removing the pilot signals from the modulation signal; and a demodulator for demodulating output of the equalizer with the modulation scheme identical with that of the modulator to recover the input data signals.

18. The OFDM communication system as set forth in claim 16, wherein the first matrices are identity matrices corresponding pilot-subcarrier groups.

19. The OFDM communication system as set forth in claim 16, wherein the second matrices maintain distances between the data signals as signal vectors, independencies between entries of each signal vector, and mean power of the data signals, and a sum of entries of each column of the second matrices is 0.

20. The OFDM communication system as set forth in claim 16, wherein the first and second matrices of the precoding matrix are main diagonal entries.

21. The OFDM communication system as set forth in claim 20, wherein the first matrices are identity matrices corresponding to the pilot groups.

22. The OFDM communication system as set forth in claim 20, wherein the second matrices maintain distances between the data signals as signal vectors, independencies between entries of each signal vector, and mean power of the data signals, and a sum of entries of each column of the second matrices is 0.

* * * * *